United States Patent [19]

Kadota et al.

[11] Patent Number: 5,061,223

[45] Date of Patent: Oct. 29, 1991

[54] HOMOKINETIC UNIVERSAL JOINT

[75] Inventors: Tetsuro Kadota, Shizuoka; Yo Mihata, Kakegawa; Mamoru Watanabe, Iwata, all of Japan

[73] Assignee: NTN Corporation, Osaka, Japan

[21] Appl. No.: 584,671

[22] Filed: Sep. 19, 1990

[30] Foreign Application Priority Data

Sep. 22, 1989 [JP] Japan ................................. 1-247610

[51] Int. Cl.$^5$ ................................................ F16D 3/20
[52] U.S. Cl. ...................................... 464/111; 464/168
[58] Field of Search .................... 464/111, 122, 168; 384/43

[56] References Cited

U.S. PATENT DOCUMENTS

| 1,918,108 | 7/1933 | Jonkhoff | 464/168 |
| 2,983,120 | 5/1961 | White | 464/168 |
| 4,684,356 | 8/1987 | Kimata et al. | 464/111 |
| 4,741,723 | 5/1988 | Orain | 464/111 |
| 4,786,270 | 11/1988 | Iwasaki | 464/111 |
| 4,840,600 | 6/1989 | White | 464/111 |

FOREIGN PATENT DOCUMENTS

| 2831044 | 10/1979 | Fed. Rep. of Germany | 464/111 |
| 59-40016 | 3/1984 | Japan | 464/111 |

Primary Examiner—Thomas R. Hannon
Attorney, Agent, or Firm—Armstrong, Nikaido, Marmelstein, Kubovcik & Murray

[57] ABSTRACT

A homokinetic universal joint having an outer ring formed in its inner surface with three axial track grooves, a tripod member inserted in the outer ring and having three legs, and guide blocks pivotally and axially slidably mounted on the respective legs and received in the respective track grooves. The guide blocks are formed in each side thereof with a ball circulating passage having straight raceways. A plurality of balls are rollingly received in each ball circulating passage. The track grooves are formed at both sides thereof with raceway grooves extending parallel to the axis of the track grooves to guide the balls along the straight raceways.

5 Claims, 3 Drawing Sheets

HOMOKINETIC UNIVERSAL JOINT

This invention relates to a slide type homokinetic universal joint mounted mainly in a front-wheel drive automobile.

A conventional universal joint of this type is shown in FIG. 10, in which three axial track grooves 32 are formed in the inner surface of an outer ring 31. A tripod member 33 mounted in the outer ring 31 is formed with three radial legs 34. A spherical roller 35 is rotatably and axially slidably mounted on each leg 34 in engagement with roller guide surfaces 36 at both sides of the respective track groove 32.

With this tripod type homokinetic universal joint, when the outer ring 31 and the tripod member 33 form a working angle, since the spherical rollers 35 are inclined with respect to the roller guide surfaces 36, they cannot make a pure rolling motion but slip occurs between the spherical rollers 35 and the roller guide surfaces 36.

Therefore, the slide resistance between them tends to be large. Slip may induce an axial thrust force, thus generating vibrations.

In order to solve the above problems, with a homokinetic universal joint described in Japanese Patent Publication 59-40016, a guide block is pivotally and axially slidably mounted on each leg protruding from the tripod member. Rolling elements are retained by the guide blocks so as to roll along rolling surfaces formed thereon. Held by the side surfaces of the guide blocks, they roll along axial rolling surfaces formed in both sides of the track grooves formed in the outer ring.

In one embodiment of this publication, the rolling elements held by the guide blocks are adapted to circulate along the outer periphery of the guide blocks. In another embodiment, they roll in a straight line along straight rolling surfaces formed in the sides of the guide blocks.

With the above-described prior art homokinetic universal joint, because the rolling elements held by the sides of the guide blocks are guided along the rolling surfaces formed at both sides of the track grooves, the guide blocks can maintain its horizontal position.

Thus, when the homokinetic universal joint forms a working angle during torque transmission, the guide blocks move longitudinally, maintaining a horizontal position. Because the rolling elements do a rolling motion during this longitudinal movement, the slide resistance can be kept small.

But, with a homokinetic universal joint of the type in which the rolling elements circulate along the outer periphery of the guide blocks, if the balls are in contact with the rolling surfaces at both sides of the track grooves, they cannot circulate. Thus it is necessary to provide a gap between one of each opposed pair of rolling surfaces and the balls. The gap can cause looseness between the outer ring and the tripod member.

On the other hand, with a homokinetic universal joint of the type in which the rolling elements move along the straight rolling surfaces formed at the sides of the guide blocks, when the guide blocks move along the track grooves, the rolling elements tend to offset toward one side of the straight rolling surfaces, getting congested. Thus, a braking force will act on the guide blocks, making it impossible to smoothly slide the outer ring and the tripod member relative to each other.

It is an object of this invention to provide a homokinetic universal joint which has the advantages of the above-described prior art homokinetic universal joints and can reduce looseness between the outer ring and the tripod member.

In accordance with the present invention, there is provided a homokinetic universal joint comprising an outer ring formed in its inner surface with three axial track grooves, a tripod member inserted in the outer ring and having three radial legs, guide blocks pivotally and axially slidably mounted on the respective legs and received in the respective track grooves, the guide blocks being formed in each side thereof with a ball guide channel having straight raceways, and a plurality of balls rollingly received in the each ball guide channel, the track grooves being formed at both sides thereof with raceway grooves extending parallel to the axis of the track grooves to guide the balls along the straight raceways.

According to the arrangement, the guide blocks are kept in a horizontal position by the balls retained between the straight raceways of the ball guide channels and the raceway grooves formed at the sides of the track grooves. The guide blocks move horizontally longitudinally when torque is transmitted with the homokinetic universal joint forming a working angle. With this movement, the balls roll, thus reducing the slide resistance.

According to this invention, when torque is transmitted with the homokinetic universal joint forming a working angle, the relative movement between the outer ring and the tripod member is transformed into a rolling motion of the balls interposed between the outer ring and the guide blocks. This remarkably reduces the sliding friction which causes slide resistance, vibrations and induced thrust.

Because the balls can be guided in the ball guide channels formed at both sides of the guide blocks, the balls can be circulated smoothly even if no looseness is provided between the portions where the balls roll. Thus such looseness can be reduced.

Further, because the balls for guiding the movement of the guide blocks move through the ball guide channels, the length of the rolling movement of the balls is not limited and thus the slide resistance can be reduced over a wide range.

Other features and objects of the present invention will become apparent from the following description taken with reference to the accompanying drawings, in which.

We shall describe the embodiment of this invention with reference to FIGS. 1-9.

Figure 1:
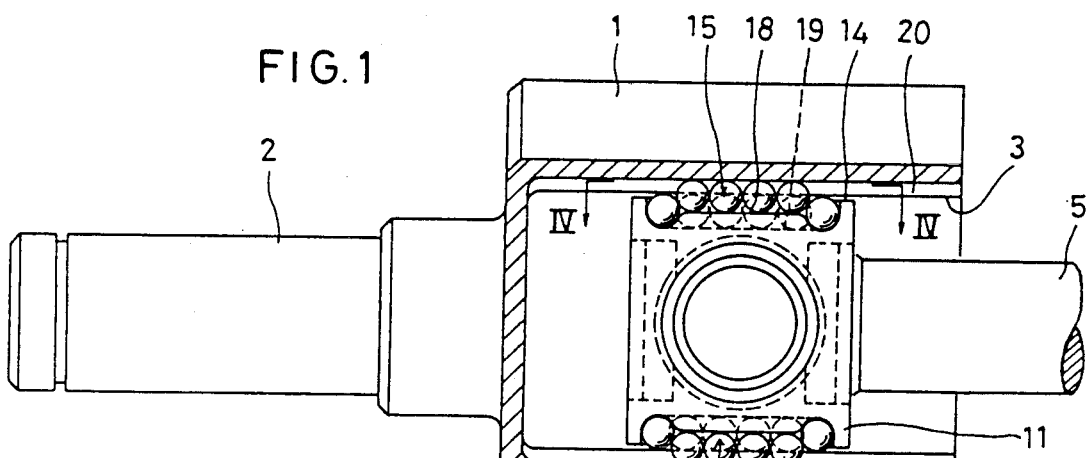
FIG. 1 is a transverse sectional plan view of the embodiment of the homokinetic universal joint according to this invention.
Figure 2:
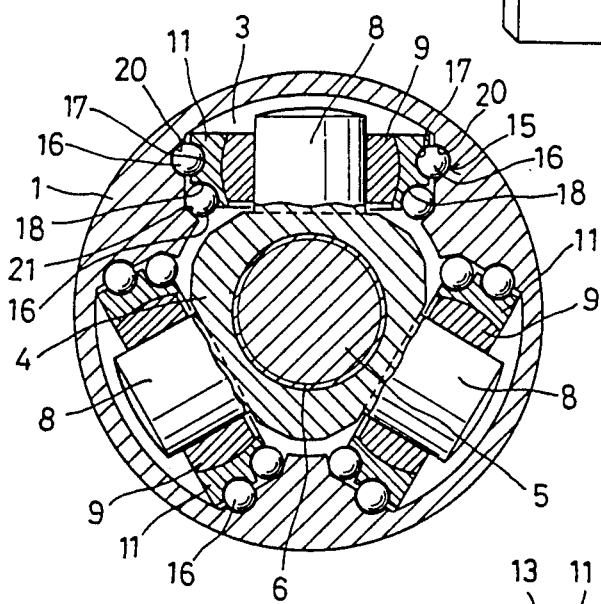
FIG. 2 is a vertical sectional side view of the same.
Figure 3:
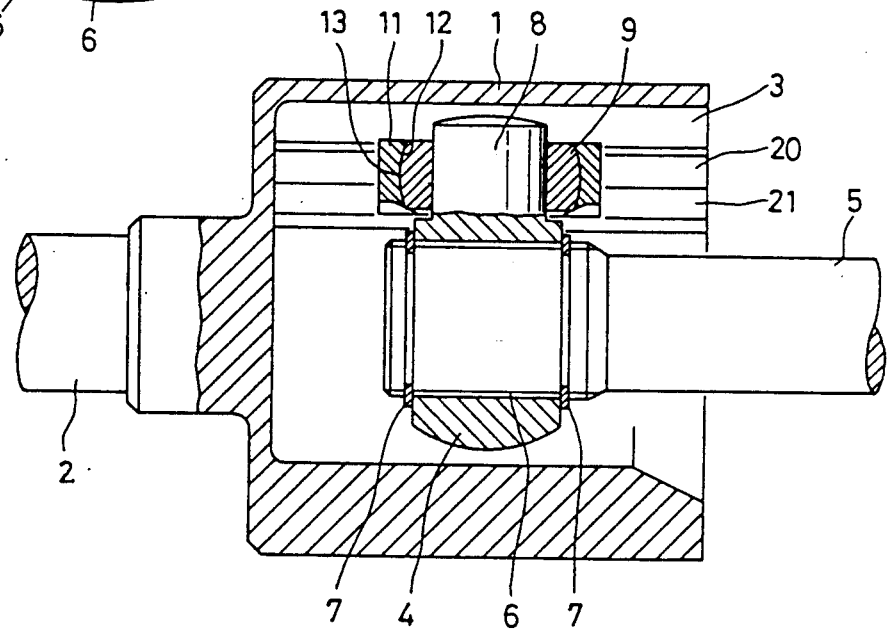
FIG. 3 is a vertical sectional front view of the same.

As shown in FIGS. 1-3, an outer ring 1 has a closed end and is provided with a first shaft 2 at the closed end. Three axial track grooves 3 are formed in the inner surface of the outer ring 1 at angularly equal intervals.

A tripod member 4, which is inserted in the outer ring 1, is fixedly mounted on a second shaft 5 so as to rotate together by the provision of serrations 6. Also, a stopper ring 7 is provided to prevent the tripod member 4 from moving axially.

The tripod member 4 has three radial legs 8. A spherical roller 9 is axially movably and rotatably mounted on each leg 8. Needles 10 mounted between the spherical rollers 9 and the legs 8 serve to guide the axial movement of the spherical rollers 9.

A guide block 11 is mounted on each spherical roller 9 and is formed with a spherical inner surface 12 adapted to be guided by a spherical outer surface 13 formed on the spherical roller 9.

Each guide block 11 has flat side surfaces 14 each formed with a ball guide channel 15 in which a plurality of balls 16 are rollingly received.

Figure 4:
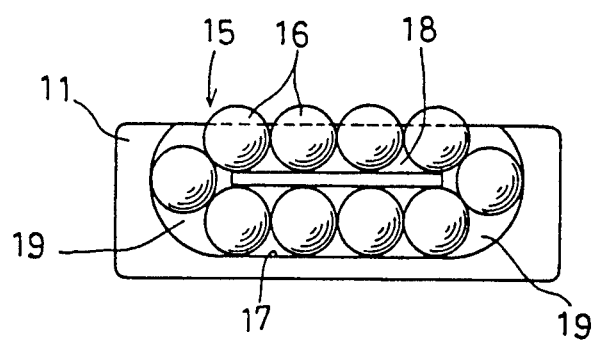
FIG. 4 is a sectional view taken along line IV—IV of FIG. 1.

As shown in FIG. 4, each ball guide channel 15 has an elliptical shape comprising two straight raceways 17 and 18 and semi-circular portions 19 connecting the ends of the straight raceways 17 and 18.

As shown in FIGS. 1 and 2, the two straight raceways 17 and 18 have different heights from each other with respect to the axis of each leg 8. The balls 16 which roll along the higher straight raceway 17 are received in axial raceway grooves 20 formed in both sides of each track groove 3.

On the other hand, the balls 16 which roll along the lower straight raceway 18 are prevented from getting out of the raceway 18 by inclined surfaces 21 formed on both sides of each track groove 3 at its inner side so as to extend inward. (FIG. 2)

Figure 5:
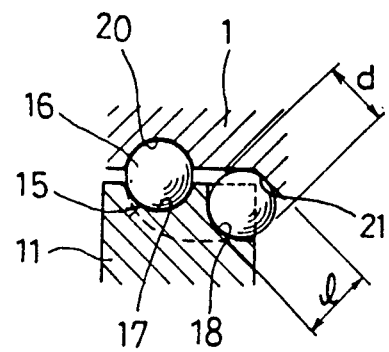
FIG. 5 is a sectional view of the ball guide channel of the same.

FIG. 5 shows the details of the ball guide channel 15. The length l between the lower straight raceway 18 and the inclined surface 21 is larger than the outer diameter d of the balls 16 so as to prevent the balls 16 from being put under load while they are moving along the straight raceway 18.

Figure 6:
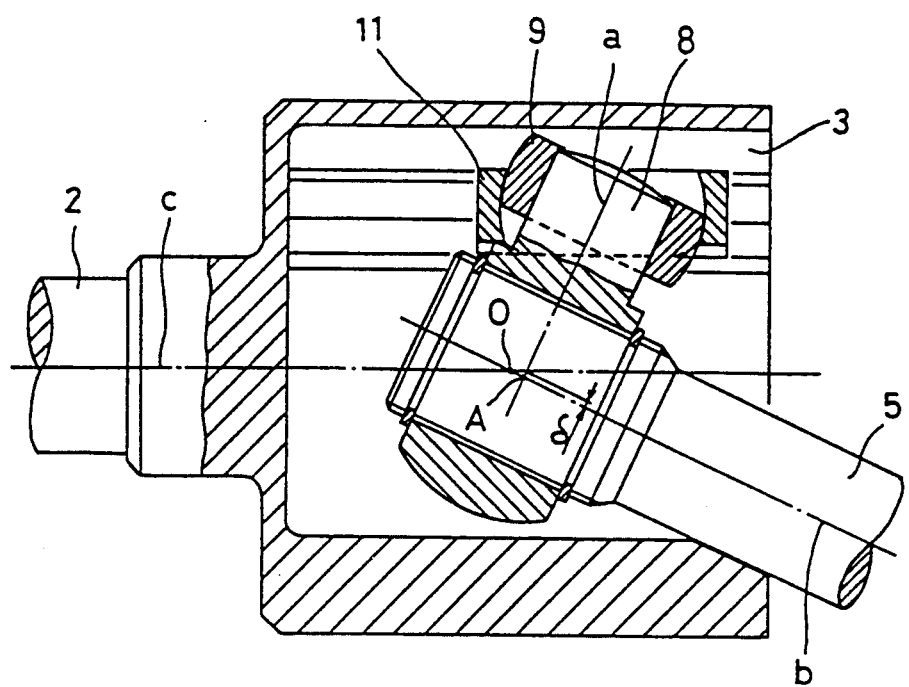
FIG. 6 is a sectional view of the same showing how it operates.

FIG. 6 shows the state in which the homokinetic universal joint of the present invention is transmitting torque with a working angle.

As shown in this figure, when the first shaft 2 and the second shaft 5 are inclined with respect to each other so that the joint forms a working angle, each of the legs 8 is inclined with respect to the longitudinal direction of the track grooves 3.

Also, because the intersection A between the axis a of each leg 8 and the axis b of the second shaft 5 is offset downwards from the intersection 0 between the axis c of the first shaft 2 and the axis b of the second shaft 5 by a distance δ, the legs 8 can move in the direction of their axis.

In this state, each guide block 11 is prevented from turning by the balls 16 received between the higher straight raceway 17 and the raceway grooves 20 in the outer ring 1. Also, each spherical roller 9 is prevented from moving axially of the legs 8 because the guide blocks 11 and the spherical rollers 9 are in a spherical contact with each other.

Thus, if the legs 8 incline, the spherical rollers 9 will incline together with the legs 8, causing a slip between the spherical rollers 9 and the guide blocks 11. (FIG. 6)

Also, if the legs move in the direction of their axis, the legs 8 and the spherical rollers 9 will slip with respect to each other to assume the position shown in FIG. 6.

Therefore, when a torque is transmitted with the joint forming a working angle, the legs 8 and the spherical rollers 9 make a pivotal motion in the guide blocks 11. On the other hand, the guide blocks 11 move longitudinally of the track grooves 3, maintaining their horizontal position. As the guide blocks 11 move, the balls 16 will roll and move in the ball guide channel 15. This serves to considerably reduce the slide resistance between the outer ring 1 and the tripod member 4 and thus to allow smooth torque transmission between the first shaft 2 and the second shaft 5.

As shown in FIG. 6, when the second shaft 5 inclines downwards with respect to the first shaft 2, the lower two of the three legs 8 shown in FIG. 2 will turn a little. This turning causes the pivotal motion between the legs 8 and the spherical rollers 9 or between the spherical rollers 9 and the guide blocks 11.

Figure 7:
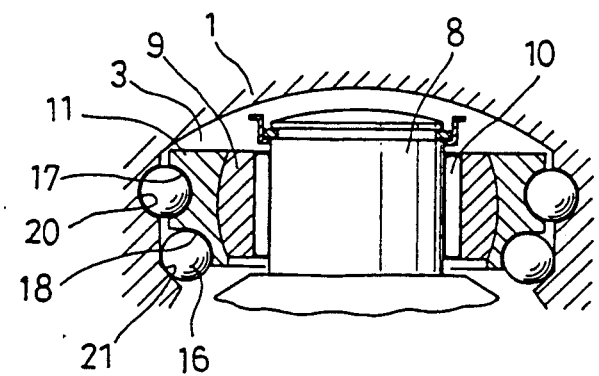
FIG. 7 is a sectional view showing another arrangement for supporting the spherical rollers.

As shown in FIG. 7, needles 10 may be mounted between the legs 8 and the spherical rollers 9 to reduce the resistance to rotation while the legs 8 are rotating.

In the embodiment shown in FIGS. 1-3, the guide blocks 11 are supported by the spherical rollers 9 fitted on the legs 8. But they may be supported in other ways.

Figure 8:
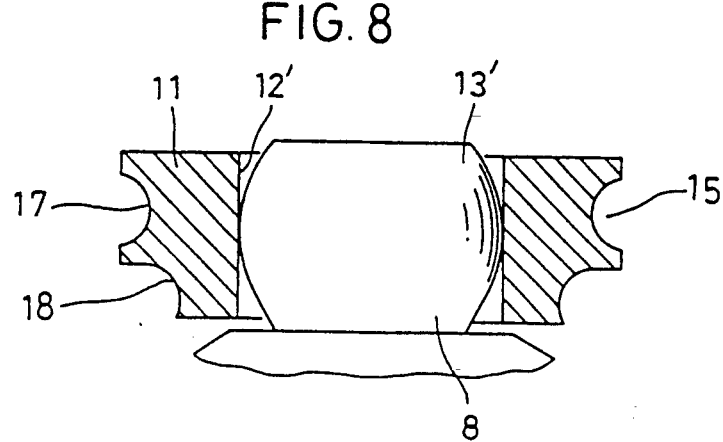
FIGS. 8 and 9 are sectional views showing other arrangements for supporting the guide blocks.
Figure 9:
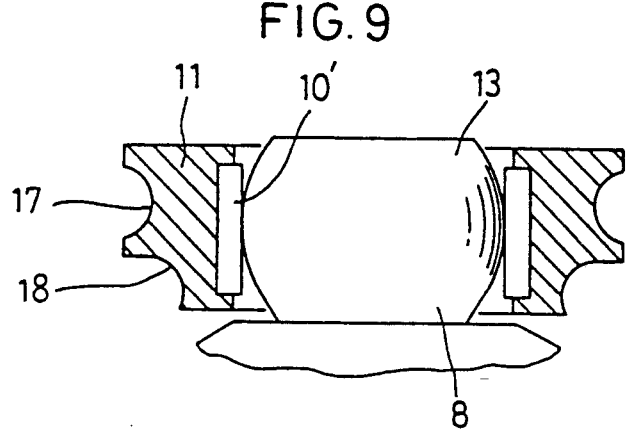
Figure 10:
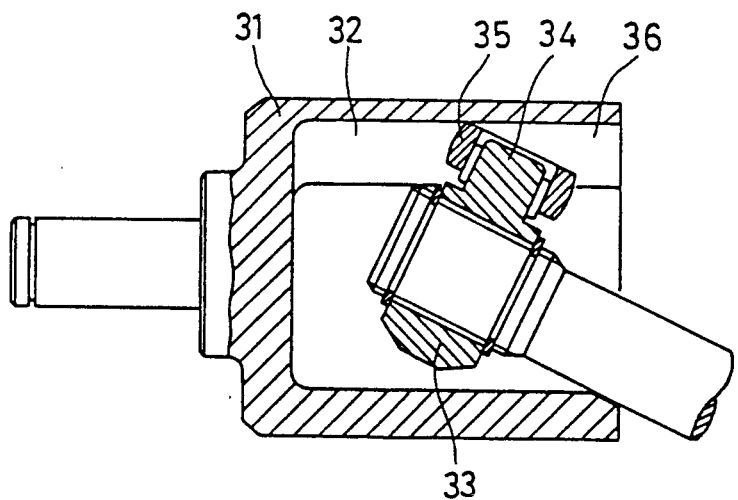
FIG. 10 is a sectional view of a conventional homokinetic universal joint.

For example, as shown in FIG. 8, a cylindrical inner surface 12' may be formed on the guide blocks 11 so as to be guided by a spherical outer surface 13' formed on the legs 8. In this case, as shown in FIG. 9, needles 10' may be disposed between the contact-guide surfaces to reduce the resistance to slip between the legs 8 and the guide blocks 11.

What is claimed is:

1. A homokinetic universal joint comprising an outer ring formed in its inner surface with three axial track grooves, a tripod member inserted in said outer ring and having three radial legs, guide blocks pivotally and axially slidably mounted on said respective legs and received in said respective track grooves, said guide blocks being formed in each side thereof with a ball guide channel having an elliptical shape and comprising two straight raceways extending parallel to each other and semi-circular portions connecting the ends of said straight raceways together, said track grooves being formed at both sides thereof with raceway grooves extending parallel to the axis of said track grooves to guide balls along said straight raceways, and a plurality of balls rollingly received in each said ball guide channel in said guide block and in said raceway groove formed in said track groove in said outer ring.

2. A homokinetic universal joint as claimed in claim 1, further comprising spherical rollers each mounted between said respective legs and guide blocks, said spherical rollers having a spherical outer periphery whereas said guide blocks have a complementary spherical inner periphery.

3. A homokinetic universal joint as claimed in claim 2, further comprising a plurality of needles mounted between said respective legs and spherical rollers.

4. A homokinetic universal joint as claimed in claim 1, wherein said legs have a spherical outer periphery whereas said guide blocks have a cylindrical inner periphery.

5. A homokinetic universal joint as claimed in claim 4, further comprising a plurality of needles mounted between said respective legs and said guide blocks.

* * * * *